(12) United States Patent
Cossu et al.

(10) Patent No.: US 9,896,568 B2
(45) Date of Patent: Feb. 20, 2018

(54) RUBBER COMPOUNDS CONTAINING SILICON DIOXIDE FOR THE PRODUCTION OF TYRES

(71) Applicants: Giancarlo Cossu, Rome (IT); Pasquale Agoretti, Ariccia (IT)

(72) Inventors: Giancarlo Cossu, Rome (IT); Pasquale Agoretti, Ariccia (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/318,199

(22) PCT Filed: Jun. 12, 2015

(86) PCT No.: PCT/IB2015/054477
§ 371 (c)(1),
(2) Date: Dec. 12, 2016

(87) PCT Pub. No.: WO2015/189828
PCT Pub. Date: Dec. 17, 2015

(65) Prior Publication Data
US 2017/0114207 A1    Apr. 27, 2017

(30) Foreign Application Priority Data

Jun. 13, 2014  (IT) .............................. RM2014A0311

(51) Int. Cl.
| C08J 3/20 | (2006.01) |
|---|---|
| C08K 3/36 | (2006.01) |
| C08J 3/22 | (2006.01) |
| C08L 9/06 | (2006.01) |

(52) U.S. Cl.
CPC ................ C08K 3/36 (2013.01); C08J 3/226 (2013.01); C08L 9/06 (2013.01); C08J 2309/06 (2013.01); C08J 2409/00 (2013.01)

(58) Field of Classification Search
CPC .... C08L 7/00; C08L 2310/00; C08L 2307/00; C08J 3/22
See application file for complete search history.

(56) References Cited

U.S. PATENT DOCUMENTS

| 6,407,165 | B1 | 6/2002 | Wang et al. | |
|---|---|---|---|---|
| 9,598,559 | B2* | 3/2017 | Agoretti | ................... C08J 3/215 |
| 9,644,085 | B2* | 5/2017 | Botti | ......................... C08L 9/00 |
| 2004/0020576 | A1 | 2/2004 | Frank et al. | |
| 2010/0190885 | A1* | 7/2010 | Hua | ...................... B60C 1/0016 523/152 |
| 2016/0168339 | A1* | 6/2016 | Grenci | ...................... B60C 1/00 523/351 |
| 2017/0121506 | A1* | 5/2017 | Cossu | ....................... C08L 7/00 |
| 2017/0130037 | A1* | 5/2017 | Cossu | ....................... C08L 7/00 |

OTHER PUBLICATIONS

Written Opinion of the International Searching Authority of PCT/IB2015/054477 dated Nov. 13, 2015.
International Search Report of PCT/IB2015/054477 dated Nov. 13, 2015.

* cited by examiner

*Primary Examiner* — Hannah Pak
(74) *Attorney, Agent, or Firm* — Sughrue Mion, PLLC

(57) ABSTRACT

A method for preparing a rubber compound comprising at least one first mixing step in which at least part of a cross-linkable polymer base is mixed at least with a reactive reinforcing filler, a dendrimer functionalized with polar groups adapted to interact with the reactive reinforcing filler and a nucleophile agent; and a subsequent mixing step in which the compound being prepared is mixed with a vulcanization system.

8 Claims, No Drawings

RUBBER COMPOUNDS CONTAINING SILICON DIOXIDE FOR THE PRODUCTION OF TYRES

CROSS REFERENCE TO RELATED APPLICATIONS

This is a National Stage of International Application No. PCT/IB2015/054477 filed Jun. 12, 2015, claiming priority based on Italian Patent Application No. RM2014A000311 filed Jun. 13, 2014, the contents of all of which are incorporated herein by reference in their entirety.

TECHNICAL FIELD

The present invention concerns rubber compounds containing silicon dioxide for the production of tyres.

BACKGROUND ART

The use of silicon dioxide as a reinforcing filler in tyre compounds has been known for some time due to its advantages in terms of rolling resistance and roadholding on wet surfaces.

Silicon dioxide is used to partially or totally substitute carbon black. The use of silicon dioxide entails a series of drawbacks due to the difficulty of dispersion of the silicon dioxide in the polymer base. Said problem derives from the presence on the silicon dioxide of surface silanol groups, which favour the formation of hydrogen bonds and, therefore, agglomerates of silicon dioxide particles, and give the silicon dioxide hydrophilic characteristics which have poor compatibility with the hydrophobic characteristics of the rubber. A poor dispersion of the silicon dioxide in the rubber compound prevents total exploitation of its advantages, especially in terms of rolling resistance.

In order to solve the dispersion problems described above, the use of silane bonding agents has been known for some time; these inhibit the formation of the above-mentioned hydrogen bonds bonding with the silanol groups and, at the same time, chemically bond the silicon dioxide to the polymer base.

In the tyre industry the need is particularly felt to find solutions able to give the tyres an increasingly low rolling resistance without compromising other properties of the compound.

As is known to persons skilled in the art, being able to guarantee an improved dispersion of the silicon dioxide in the compound would make it more effective in terms of rolling resistance and would consequently permit a more limited use of the silicon dioxide.

However, it has been experimentally ascertained that a reduction in the reinforcing filler produces a deterioration in the mechanical properties of the compounds despite contributing to an improvement in terms of rolling resistance.

The need was felt for a solution which produces in the tyres an improvement in the rolling resistance together with an improvement in the mechanical properties. In particular, the need was felt for a solution able to reduce the quantity of the reinforcing filler in the compound while guaranteeing an improvement in the mechanical properties together with an improvement in the rolling resistance.

DISCLOSURE OF INVENTION

The subject of the present invention is a method for preparing a rubber compound; said method being characterised in that it comprises at least a first mixing step in which at least part of a cross-linkable polymer base is mixed at least with a reactive reinforcing filler, a dendrimer functionalized with polar groups adapted to interact with the reactive reinforcing filler and a nucleophile agent; and a subsequent mixing step in which the compound being prepared is mixed with a vulcanization system.

Preferably, the dendrimer is functionalized with polar groups comprised in the group composed of carboxyls, carbonyls, hydroxyls, isocyanates, amines, amides, esters, trialkoxysilanes, acrylates, methacrylates and polyethylene oxides.

Preferably, the dendrimer functionalized with polar groups is present in the compound in a quantity ranging from 1 to 50 phr.

Preferably, the nucleophile agent is added in the first mixing step in a quantity ranging from 0.6 to 5 phr.

Preferably, the nucleophile agent is comprised in the class of the guanidines or the sulfenamides.

Preferably, the nucleophile agent is comprised in the group composed of diphenyl guanidine (DPG), mercapto benzothiazole disulfide (MBTS), N-tert-butyl-2-benzothiazyl-sulfenamide (TBBS), tetrabenzyl thiuram disulfide (TBzTD), benzothiazyl-cyclohexyl-sulfenamide (CBS).

Preferably, the cross-linkable polymer base is comprised in the group composed of styrene-butadiene rubber, butyl rubber, natural rubber, isoprene rubber or mixtures thereof.

Preferably, the reactive reinforcing filler is silicon dioxide.

Preferably, the method comprises an intermediate mixing step between said first mixing step and said successive mixing step and during which the compound being prepared is mixed with at least one silane bonding agent.

Preferably, a fraction of cross-linkable polymer base ranging between 20 and 80% by weight of the total cross-linkable polymer base is added in the first mixing step, and the remaining part of cross-linkable polymer base is added in the intermediate mixing step.

Preferably, a fraction of silicon dioxide ranging between 10 and 80% by weight of the total silicon dioxide is added in the first mixing step, and the remaining part of silicon dioxide is added in the intermediate mixing step.

A further subject of the present invention is a rubber compound prepared with the method subject of the present invention.

A further subject of the present invention is a tyre portion produced with a compound as defined above; preferably this tyre portion is a tread.

A further subject of the present invention is a tyre comprising a portion as defined above.

BEST MODE FOR CARRYING OUT THE INVENTION

Embodiment examples are given below for purely illustrative non-limiting purposes.

Examples

Five comparison compounds (A-E) were prepared, produced with different methods from that of the present invention, and two compounds of the invention (F and G) produced with the method according to the present invention.

In particular, the comparison compound A represents a compound prepared with the standard method in which the polymer base, the silicon dioxide and the silane agent are mixed in one single step without the presence of the dendrimer and the nucleophile agent; the comparison compound B was prepared with a method that differs from the preparation method of the compound A due to the fact that in the single mixing step the nucleophile agent was also added; the comparison compound C was prepared with a method that differs from the preparation method of the compound A due to the fact that in the single mixing step the nucleophile agent and the dendrimer were also added; the comparison compound D was prepared with a method in which in a first mixing step part of the polymer base, part of the silicon dioxide and the nucleophile agent were mixed with one another and, subsequently, in a second mixing step, the remaining part of the polymer base, the remaining part of the silicon dioxide and the silane bonding agent were added and mixed with the compound coming from the first mixing step; the comparison compound E was prepared with a method in which in a first mixing step, part of the polymer base, part of the silicon dioxide and the dendrimer were mixed with one another and, subsequently, in a second mixing step, the remaining part of the polymer base, the remaining part of the silicon dioxide, the silane bonding agent and the nucleophile agent were added and mixed with the compound coming from the first mixing step.

The compounds of the invention F and G were prepared with a method in which in a first mixing stage part of the polymer base, part of the silicon dioxide, the dendrimer and the nucleophile agent were mixed with one another and, subsequently, in a second mixing step the remaining part of the polymer base, the remaining part of the silicon dioxide and the silane bonding agent were added and mixed with the compound coming from the first mixing step. The compounds of the invention F and G are distinguished from each other by the different quantity of silicon dioxide used.

—Preparation of the Compounds—

The comparison compounds A-C were prepared with the procedure described below.

(Single Mixing Step)

Prior to the beginning of the mixing, the ingredients listed in table I were loaded in a mixer with tangential rotors and internal volume ranging from 230 to 270 liters, reaching a filling factor ranging from 66 to 72%.

The mixer was operated at a speed ranging from 40 to 60 r.p.m., and the mixture formed was discharged once a temperature ranging from 140 to 160° C. had been reached.

(Final Mixing Step)

The ingredients listed in table I were added to the mixture obtained from the previous step, reaching a filling factor ranging from 63 to 67%.

The mixer was operated at a speed ranging from 20 to 40 r.p.m., and the mixture formed was discharged once a temperature ranging from 100 to 110° C. had been reached.

As appears evident in the description of the above procedure, in the present description the expression "single mixing step" means mixing of the cross-linkable polymer base with all the ingredients of the compound with the exception of those involved in the vulcanization process (sulphur, stearic acid, zinc oxide and accelerators), which are mixed in the "final mixing step".

The comparison compounds D and E and the compounds of the invention F and G were prepared according to the procedure described below:

—Preparation of the Compounds—

(1st Mixing Step)

Prior to the beginning of the mixing, the ingredients listed in table II were loaded in a mixer with tangential rotors and internal volume ranging from 230 to 270 liters, reaching a filling factor ranging from 66 to 72%.

The mixer was operated at a speed ranging from 40 to 60 r.p.m., and the mixture formed was discharged once a temperature ranging from 140 to 160° C. had been reached.

(2nd Mixing Step)

Prior to the beginning of the mixing, the ingredients listed in table II were loaded in a mixer with tangential rotors and internal volume ranging from 230 to 270 liters, reaching a filling factor ranging from 66 to 72%.

The mixer was operated at a speed ranging from 40 to 60 r.p.m., and the mixture formed was discharged once a temperature ranging from 140 to 160° C. had been reached.

(Final Mixing Step)

The ingredients indicated in Table I were added to the mixture obtained from the previous step reaching a filling factor ranging from 63 to 67%.

The mixer was operated at a speed ranging from 20 to 40 r.p.m., and the mixture formed was discharged once a temperature ranging from 100 to 110° C. had been reached.

Table I shows the compositions in phr of the comparison compounds A-C with indication of the steps in which the various ingredients were added.

TABLE I

|  | A | B | C |
|---|---|---|---|
| Single mixing step | | | |
| S-SBR | 80 | 80 | 80 |
| BR | 20 | 20 | 20 |
| Dendrimer | — | — | 20 |
| Carbon black | 8 | 8 | 8 |
| Silicon dioxide | 80 | 80 | 80 |
| Silane bonding agent | 8 | 8 | 8 |
| DPG (nucleophile agent) | — | 1 | 1 |
| Stearic acid | 2 | — | — |
| Final mixing step | | | |
| Stearic acid | — | 2 | 2 |
| Sulphur | 1.4 | 1.4 | 1.4 |
| ZnO | 2 | 2 | 2 |
| MBTS | 1 | 1 | 1 |
| DPG | 1 | — | — |

Table II shows the compositions in phr of the comparison compounds D-E and of the compounds of the invention F and G, with indication of the steps in which the various ingredients were added.

TABLE II

|  | D | E | F | G |
|---|---|---|---|---|
| 1st mixing step | | | | |
| BR | 20 | 20 | 20 | 20 |
| Dendrimer | — | 20 | 20 | 20 |
| Silicon dioxide | 40 | 40 | 40 | 40 |
| DPG (nucleophile agent) | 1 | — | 1 | 1 |
| 2nd mixing step | | | | |
| S-SBR | 80 | 80 | 80 | 80 |
| Silicon dioxide | 40 | 40 | 40 | — |
| Carbon black | 8 | 8 | 8 | 4 |

TABLE II-continued

|  | D | E | F | G |
|---|---|---|---|---|
| Silane bonding agent | 8 | 8 | 8 | 4 |
| DPG (nucleophile agent) | — | 1 | — | — |
| Final mixing step | | | | |
| Stearic acid | 2 | 2 | 2 | 2 |
| Sulphur | 1.4 | 1.4 | 1.4 | 1.4 |
| ZnO | 2 | 2 | 2 | 2 |
| MBTS | 1 | 1 | 1 | 1 |

S-SBR is a polymer base obtained by means of a polymerisation process in solution with a mean molecular weight ranging from $800 \times 10^3$ to $1500 \times 10^3$ and from $500 \times 10^3$ to $900 \times 10^3$ respectively, with a styrene content ranging from 20 to 45%.

The dendrimer used is hyperbranched bis-MPA polyester-64-hydroxyl containing a mean of 64 hydroxyl groups on the surface.

The silicon dioxide used is marketed under the name VN3 by the company EVONIK and has a surface area of approximately 170 m²/g.

The silane bonding agent used has the formula $(CH_3CH_2O)_3Si(CH_2)_3SS(CH_2)_3Si(OCH_2CH_3)_3$ and is marketed under the name SI75 by the company EVONIK.

MBTS is the abbreviation of the chemical mercapto benzothiazole disulfide.

DPG is the abbreviation of the chemical diphenyl-guanidine.

The compounds shown in Tables I and II underwent a series of tests in order to evaluate their properties relative to rolling resistance and stiffness.

In particular, the dynamic properties were measured according to the ISO 4664 standard (as is known to a person skilled in the art, the hysteresis values are strictly correlated with the rolling resistance property: the lower the hysteresis value, the better the rolling resistance); the mechanical properties were measured according to the ASTM D412C standard.

Table III shows the results obtained by the above tests, the values of which were indexed on the basis of the results obtained from the comparison compound A which represents the standard method. For both the parameters shown in Table III, the higher the value obtained, the better the corresponding property.

TABLE III

|  | A | B | C | D | E | F | G |
|---|---|---|---|---|---|---|---|
| Rolling resistance | 100 | 103 | 105 | 105 | 108 | 120 | 130 |
| Stiffness | 100 | 100 | 100 | 95 | 100 | 115 | 105 |

As appears evident from a comparison of the data shown in Table III, the compounds produced with the method of the present invention have better rolling resistance and better stiffness.

In particular, it should be highlighted that the present invention allows the quantity of silicon dioxide used to be reduced without compromising the characteristic of stiffness.

The discriminating condition for obtaining the advantages sought is preliminary treatment of at least part of the silicon dioxide with an appropriately functionalized dendrimer and with a nucleophile agent in the presence of at least part of the polymer base. In fact, if said condition does not occur, the advantages in terms of rolling resistance and stiffness are not obtained.

The results relative to the comparison compounds B and C show that the use in one single mixing step of the nucleophile agent only (compound B) or of the nucleophile agent together with the dendrimer (compound C) do not allow the desired advantages of rolling resistance and stiffness to be obtained. The results relative to the comparison compounds D and E show that use in a first mixing step of the nucleophile agent only (compound D) or of the dendrimer only (compound E) does not allow the desired advantages of rolling resistance and stiffness to be obtained.

The invention claimed is:

1. A method for preparing a rubber compound; said method comprising a first mixing step, during which at least part of a cross-linkable polymer base is mixed with silicon dioxide, a dendrimer functionalized with polar groups suited to interact with the silicon dioxide, and a nucleophile agent; and a successive mixing step, during which the rubber compound being prepared is mixed with a vulcanization system; said method comprising an intermediate mixing step between said first mixing step and said successive mixing step and during which the rubber compound being prepared is mixed with at least one silane bonding agent; a fraction of the cross-linkable polymer base ranging from 20 to 80% by weight of the overall cross-linkable polymer base being added during the first mixing step, and the remaining part of the cross-linkable polymer base being added during the intermediate mixing step.

2. The method according to claim 1, wherein said dendrimer is functionalized with polar groups selected from the group consisting of carboxyls, carbonyls, hydroxyls, isocyanates, amines, amides, esters, trialkoxysilanes, acrylates, methacrylates and polyethylene oxides.

3. The method according to claim 1, wherein the dendrimer functionalized with polar groups is available in the rubber compound in a quantity ranging from 1 to 50 phr.

4. The method according to claim 1, wherein the nucleophile agent is added during the first mixing step in a quantity ranging from 0.6 to 5 phr.

5. The method according to claim 1, wherein the nucleophile agent comprises guanidines or sulfenamides.

6. The method according to claim 1, wherein the nucleophile agent is selected from the group consisting of diphenyl guanidine (DPG), mercapto benzothiazole disulfide (MBTS), N-tert-butyl-2-benzothiazyl-sulfenamide (TBBS), tetrabenzyl thiuram disulfide (TBzTD), and benzothiazyl-cyclohexyl-sulfenamide (CBS).

7. The method according to claim 1, wherein the cross-linkable polymer base is selected from the group consisting of styrene-butadiene rubber, butyl rubber, natural rubber, isoprene rubber and mixtures thereof.

8. The method according to claim 1, wherein a fraction of silicon dioxide ranging from 10 to 80% by weight of the overall silicon dioxide is added during the first mixing step, and the remaining part of silicon dioxide is added during the intermediate mixing step.

* * * * *

UNITED STATES PATENT AND TRADEMARK OFFICE
CERTIFICATE OF CORRECTION

PATENT NO. : 9,896,568 B2
APPLICATION NO. : 15/318199
DATED : February 20, 2018
INVENTOR(S) : Giancarlo Cossu et al.

It is certified that error appears in the above-identified patent and that said Letters Patent is hereby corrected as shown below:

On the Title Page

Delete "(71) Applicants: Giancarlo Cossu, Rome (IT); Pasquale Agoretti, Ariccia (IT)", and insert therefor --(71) Applicant: BRIDGESTONE CORPORATION, Tokyo (JP)--

Signed and Sealed this
Tenth Day of April, 2018

Andrei Iancu
*Director of the United States Patent and Trademark Office*